(12) United States Patent
Shimode

(10) Patent No.: US 11,695,357 B2
(45) Date of Patent: Jul. 4, 2023

(54) MOTOR CONTROL DEVICE

(71) Applicant: TOYOTA JIDOSHA KABUSHIKI KAISHA, Toyota (JP)

(72) Inventor: Kazumasa Shimode, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/824,314

(22) Filed: May 25, 2022

(65) Prior Publication Data

US 2023/0006581 A1    Jan. 5, 2023

(30) Foreign Application Priority Data

Jul. 2, 2021    (JP) ................................. 2021-110537

(51) Int. Cl.
  *H02P 21/00*    (2016.01)
  *H02P 21/14*    (2016.01)
  *H02P 27/06*    (2006.01)
(52) U.S. Cl.
  CPC .......... *H02P 21/0014* (2013.01); *H02P 21/14* (2013.01); *H02P 27/06* (2013.01)
(58) Field of Classification Search
  CPC ...... H02P 21/0014; H02P 21/14; H02P 27/06; G01R 19/00
  See application file for complete search history.

(56) References Cited

U.S. PATENT DOCUMENTS

| 8,013,556 B2 * | 9/2011 | Hattori .................... H02P 21/05 |
| | | 318/433 |
| 8,664,902 B2 * | 3/2014 | Iwasaki ................... H02P 27/08 |
| | | 318/400.02 |
| 2013/0049655 A1 * | 2/2013 | Takai ...................... H02P 21/22 |
| | | 318/400.02 |
| 2016/0181955 A1 | 6/2016 | Suzuki |
| 2018/0309389 A1 * | 10/2018 | Tagawa ................... H02M 1/38 |
| 2021/0134260 A1 * | 5/2021 | Chang .............. G10K 11/17873 |

FOREIGN PATENT DOCUMENTS

| JP | 2008301695 A | * 12/2008 |
| JP | 2009-098091 A | 5/2009 |
| JP | 2016-119817 A | 6/2016 |

* cited by examiner

*Primary Examiner* — Bickey Dhakal
(74) *Attorney, Agent, or Firm* — Dinsmore & Shohl LLP

(57) ABSTRACT

A motor control device includes a motor that generates torque corresponding to a current for energizing multi-phase coils, a current sensor that detects a current value of the current for energizing the multi-phase coils, and a controller that obtains a current value of a current flowing through a predetermined coil by adding an origin learning value to a signal input from the current sensor and that controls a current for energizing the predetermined coil based on the current value. The motor control device obtains, each time the origin learning value is changed by a predetermined value, an amplitude of a predetermined order in a q-axis current of the motor based on the changed origin learning value and the signal input from the current sensor, and performs correction based on the origin learning value at the time when the amplitude switches from a decreasing tendency to an increasing tendency.

4 Claims, 5 Drawing Sheets

MOTOR CONTROL DEVICE

CROSS-REFERENCE TO RELATED APPLICATION

This application claims priority to Japanese Patent Application No. 2021-110537 filed on Jul. 2, 2021, incorporated herein by reference in its entirety.

BACKGROUND

1. Technical Field

The present disclosure relates to a motor control device provided as a driving force source for a vehicle.

2. Description of Related Art

A motor as a driving force source provided in a conventional electrified vehicle is driven when an alternating current (AC) voltage is applied from a power supply. The AC voltage is controlled by using the current value of each phase in the motor as a feedback value. A current sensor outputs a signal such as a voltage corresponding to the detected value to the controller. Thus, for example, the controller is configured to determine the current value of the current flowing through the current sensor with reference to the voltage value input to the controller when the current value of the current actually flowing is 0 A. That is, the signal (for example, the voltage value) output from the current sensor when the current flowing through the current sensor is 0 A is stored in the controller in advance as an offset value. Therefore, the controller controls the voltage applied to the motor by adding the offset value to the feedback value from the current sensor. Accordingly, when the offset value of the sensor that detects the current value of a predetermined phase changes due to some factor, the current value determined by the controller differs from the actual current value. In such a case, since the voltage applied to the predetermined phase is changed, the output torque of the motor may pulsate and vibration called motor noise may occur.

Therefore, a control device described in Japanese Unexamined Patent Application Publication No. 2016-119817 (JP 2016-119817 A) is configured to correct the offset value described above. In the motor described in JP 2016-119817 A, the torque is controlled by controlling an inverter that is provided between the motor and the direct current (DC) power supply and that is composed of switch elements and diodes arranged in antiparallel. Therefore, when a switch element is stopped, no current flows in the phase connected to the DC power supply via the switch element. That is, the theoretical current value of the phase connected to the DC power supply via the stopped switch element is 0 A. Therefore, the control device described in JP 2016-119817 A is configured to detect with the current sensor the current value of the phase connected to the DC power supply via the stopped switch element at a timing when the vehicle is stopped or when the switch element is temporarily stopped while the vehicle is running, to store the detected current value as the offset value.

SUMMARY

According to the control device described in JP 2016-119817 A, the detection value of the current sensor at the time when the current value theoretically becomes 0 A is stored as an offset value. However, the signal input from the current sensor to the controller includes noise from surrounding electrical equipment such as the current sensor and the circuit connecting the current sensor and the controller. In addition, variation occurs in the detected value depending on the temperature of the current sensor and the like. Therefore, it is difficult to make the offset value an accurate value, and the output torque of the motor may pulsate, resulting in motor noise.

The present disclosure has been made by paying attention to the above technical problems, and an object of the present disclosure is to provide a motor control device capable of correcting an origin learning value for suppressing motor noise.

In order to achieve the above object, the present disclosure provides a motor control device including a motor that includes multi-phase coils and that generates torque corresponding to a current for energizing the multi-phase coils, a current sensor that detects a current value of a current for energizing at least one predetermined coil of the multi-phase coils and that outputs a signal corresponding to the detected current value, and a controller that obtains a current value of a current flowing through the predetermined coil by adding an origin learning value to the signal input from the current sensor and that controls a current for energizing the predetermined coil based on the obtained current value. In the motor control device, the controller is configured to obtain, each time the origin learning value is changed by a predetermined value, an amplitude of a predetermined order in a q-axis current of the motor based on the changed origin learning value and the signal input from the current sensor, and correct the origin learning value based on the origin learning value at the time when the amplitude switches from a decreasing tendency to an increasing tendency.

In the present disclosure, the predetermined order may include an electric first order.

In the present disclosure, the motor may be provided in a tire wheel.

The amplitude of the predetermined order may be obtained by performing a fast Fourier transform on the q-axis current.

In the present disclosure, the motor may include a U-phase coil, a V-phase coil, and a W-phase coil, and a neutral point to which one terminal of each of the U-phase coil, the V-phase coil, and the W-phase coil is connected, and the current sensor may include a first current sensor that detects a current flowing through any one of the U-phase coil, the V-phase coil, and the W-phase coil, and a second current sensor that detects a current flowing through another one of the U-phase coil, the V-phase coil, and the W-phase coil.

According to the present disclosure, the current value of the current actually flowing through the predetermined coil is obtained by adding the origin learning value to the current value detected by the current sensor. The origin learning value is changed by a predetermined value, and each time the origin learning value is changed in that way, the amplitude of a predetermined order in the q-axis current is obtained based on the changed origin learning value and the signal input from the current sensor. Then, the origin learning value is corrected based on the origin learning value at the time when the amplitude switches from a decreasing tendency to an increasing tendency. That is, the origin learning value at which the pulsation of the q-axis current becomes small is obtained to correct the origin learning value. By correcting the origin learning value in this way, it is possible to accurately correct the origin learning value without being affected by factors such as noise from peripheral devices or the temperature of the current sensors. As a result, the motor noise can be reduced, and eventually the vibration of the vehicle and the vehicle interior noise can be reduced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
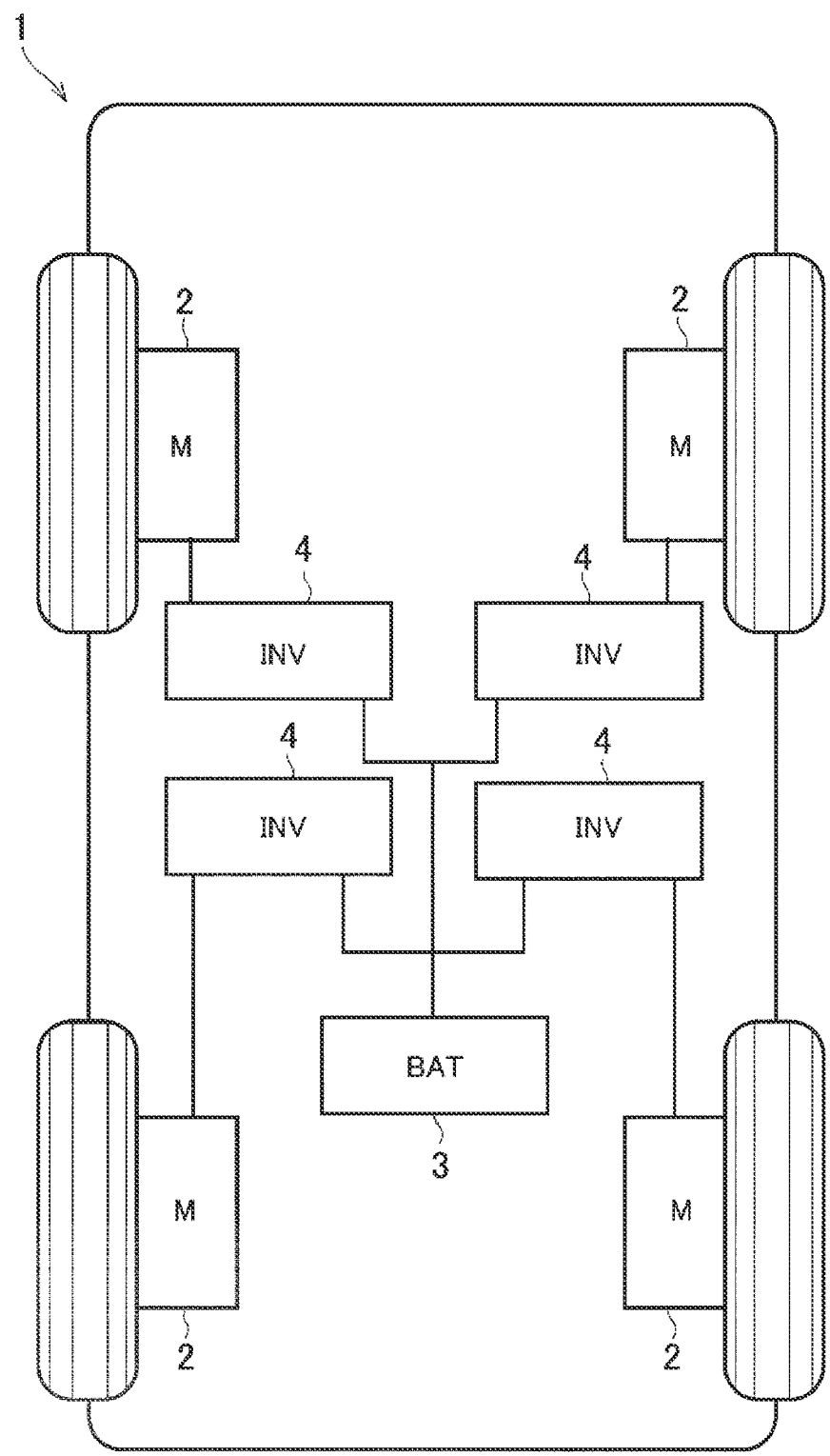
FIG. 1 is a schematic diagram illustrating an example of a vehicle provided with a motor according to an embodiment of the present disclosure.

An example of a vehicle provided with a motor according to an embodiment of the present disclosure is schematically shown in FIG. 1. A vehicle 1 shown in FIG. 1 is a so-called in-wheel motor vehicle in which a motor (M) 2 is provided in each tire wheel, and a case accommodating the motor 2 is held by a vehicle body via a knuckle or suspension (not shown). The motor according to the embodiment of the present disclosure may be a motor provided as a driving force source for the vehicle and may be a motor supported by the vehicle body via a mount.

Similar to a motor provided as a driving force source for a conventional battery electric vehicle or a hybrid electric vehicle, the above motor 2 is a three-phase alternating current (AC) synchronous motor or an induction motor including multi-phase coils, and is configured to generate torque according to the current for energizing the coils. In the following description, a synchronous motor in which a permanent magnet is attached to a rotor will be described as an example.

The motor 2 is configured to output drive torque by being supplied with electric power from a direct current (DC) power supply (BAT) 3 provided in the vehicle 1. When regenerative torque is output from the motor 2 so as to reduce the rotation speed of the motor 2, that is, when the motor 2 is made to be rotated, an induced voltage is generated in the motor 2, and as a result, the DC power supply 3 can be charged. That is, the motor 2 is configured to function as a motor generator. In the following description, the DC power supply 3 is simply referred to as a power supply 3.

The vehicle 1 shown in FIG. 1 includes an inverter (INV) 4 between each motor 2 and the power supply 3. The inverter 4 converts the DC voltage output from the power supply 3 into an AC voltage to output the AC voltage to each motor 2, and converts the AC induced voltage generated by each motor 2 into a DC voltage to output the DC voltage to the power supply 3.

Figure 2:
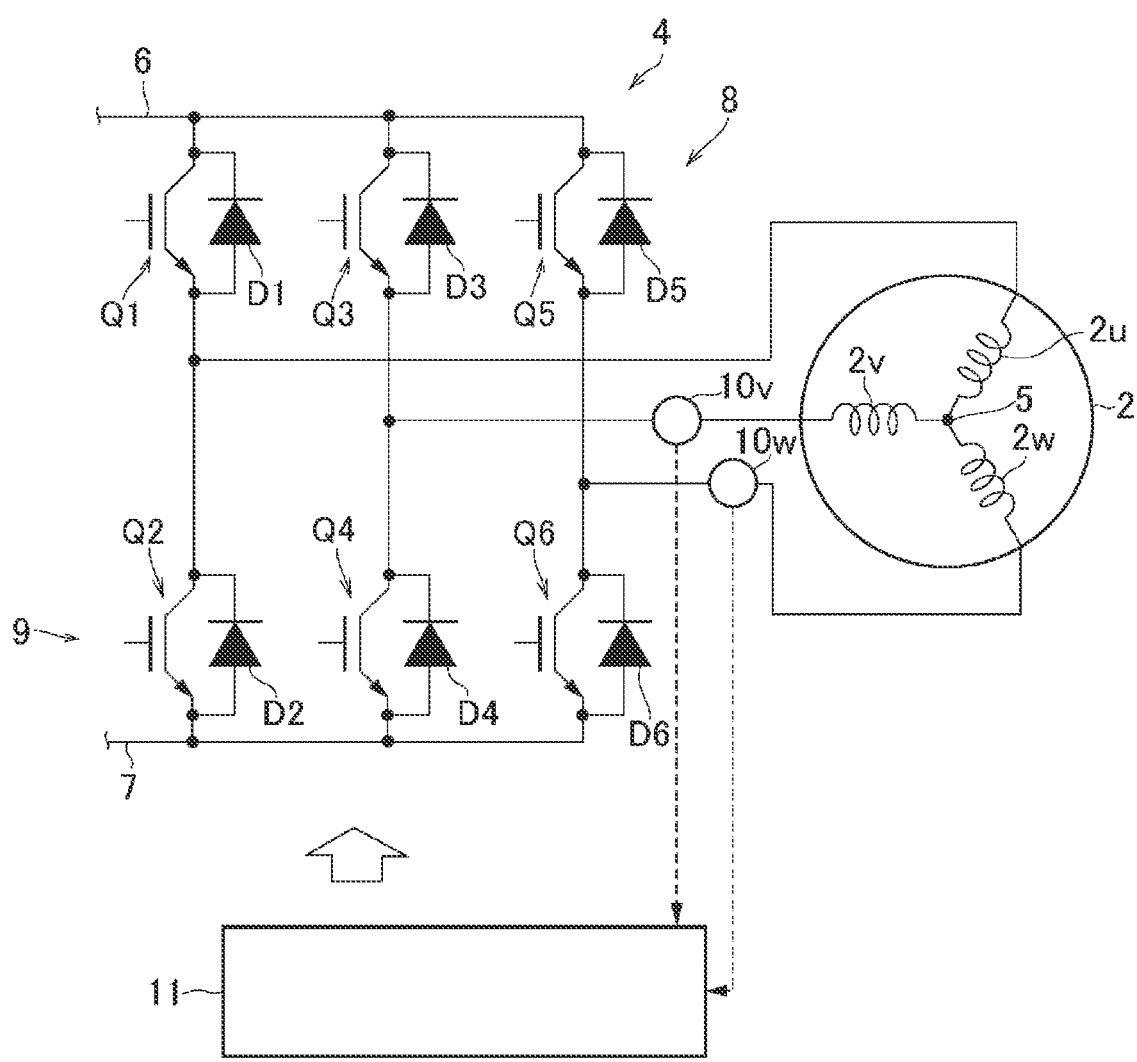
FIG. 2 is an electric circuit diagram illustrating an example of a configuration of a motor and an inverter.

FIG. 2 is an electric circuit diagram illustrating an example of a configuration of the motor 2 and the inverter 4. As described above, since the motor 2 is a three-phase AC motor, the motor 2 includes a U-phase coil $2u$, a V-phase coil $2v$, and a W-phase coil $2w$. In each coil $2u$, $2v$, $2w$, one terminal is connected to a neutral point 5, and the other terminal is connected to the inverter 4.

The inverter 4 shown in FIG. 2 is composed of an upper arm switch (element) 8 and a lower arm switch (element) 9 provided between a positive electrode bus 6 connected to the positive electrode terminal of the power supply 3 and a negative electrode bus 7 connected to the negative electrode terminal of the power supply 3. The collectors that are the high potential side terminals of the upper arm switch 8 are connected to the positive electrode bus 6. The emitters that are the low potential side terminals of the upper arm switch 8 are connected to the collectors that are the high potential side terminals of the lower arm switch 9. The emitters that are the low potential side terminals of the lower arm switch 9 are connected to the negative electrode bus 7. That is, the upper arm switch 8 and the lower arm switch 9 are connected in series.

As described above, since the motor 2 is a three-phase AC motor, the upper arm switch 8 and the lower arm switch 9 are each composed of three switches. Specifically, the upper arm switch 8 is composed of a first switch Q1 connected to the U-phase coil $2u$, a third switch Q3 connected to the V-phase coil $2v$, and a fifth switch Q5 connected to the W-phase coil $2w$. The lower arm switch 9 is composed of a second switch Q2 connected to the U-phase coil $2u$, a fourth switch Q4 connected to the V-phase coil $2v$, and a sixth switch Q6 connected to the W-phase coil $2w$.

Each of these switches Q1 to Q6 is composed of a conventionally known insulated gate bipolar transistor (IGBT), and flywheel diodes D1 to D6 are connected to the IGBT in antiparallel. The switches Q1 to Q6 are not limited to IGBTs, and may be configured by other switch elements such as, for example, a metal-oxide film semiconductor field-effect transistor (MOSFET).

One end of the U-phase coil $2u$ is connected to the connection point between the first switch Q1 and the second switch Q2, one end of the V-phase coil $2v$ is connected to the connection point between the third switch Q3 and the fourth switch Q4, and one end of the W-phase coil $2w$ is connected to the connection point between the fifth switch Q5 and the sixth switch Q6.

The power circuit described above is provided with current sensors $10v$, $10w$ for detecting the current flowing through the V-phase coil $2v$ and the W-phase coil $2w$. Since one terminal of each phase coil $2u$, $2v$, $2w$ is connected at the neutral point 5 as described above, the current flowing through the U-phase coil $2u$ can be obtained through calculation by detecting the current flowing through the V-phase coil $2v$ and the W-phase coil $2w$. The current sensor $10v$ that detects the current flowing through the V-phase coil $2v$ corresponds to the "first current sensor" in the embodiment of the present disclosure, and the current sensor $10w$ that detects the current flowing through the W-phase coil $2w$ corresponds to the "second current sensor" in the embodiment of the present disclosure.

The configuration is provided with an electronic control unit (hereinafter referred to as ECU) 11 to which signals are input from various sensors such as the above-mentioned current sensors $10v$, $10w$, a rotation speed sensor such as a resolver that detects the rotation speed of the motor 2, an accelerator operation amount sensor that detects the operation amount of the accelerator pedal (not shown), and a brake sensor that detects the operation amount of the brake pedal, and from which a command signal is output to the motor 2 according to the signals and a map, an arithmetic expression, or the like stored in advance. The ECU 11 can be configured in the same manner as a conventionally known electronic control device, and is mainly composed of a microcomputer.

The ECU 11 obtains the required driving force according to the accelerator operation amount detected by the accelerator operation amount sensor, or obtains the required braking force according to the brake operation amount detected by the brake sensor. Then, in order to output the torque corresponding to the required driving force and the required braking force from the motor 2, the ECU 11 obtains the d-axis current and the q-axis current in the same manner as the conventionally known torque control of the motor, and controls the voltage applied to the U-phase coil 2u, the V-phase coil 2v, and the W-phase coil 2w based on the rotation angle of the motor 2 and the q-axis current. Specifically, the ECU 11 controls the on/off duty of each switch Q1 to Q6.

By controlling the switches Q1 to Q6 as described above, the current value of the current flowing through each phase coil 2u, 2v, 2w is detected by the current sensors 10v, 10w, and feedback of the difference between the detected values detected by the current sensors 10v, 10w and the target value is performed.

The current sensors 10v, 10w are configured to output to the ECU 11 a signal (for example, voltage) corresponding to the current value of the current flowing through the current sensors 10v, 10w. Specifically, for example, when the current value of the current flowing through the current sensor 10v is 0 A, a predetermined voltage is output from the current sensor 10v to the ECU 11. Further, as the current value of the current flowing through the current sensor 10v increases, a voltage having a magnitude obtained by adding a voltage that is a predetermined multiple of the increased amount to the above-mentioned predetermined voltage is input from the current sensor 10v to the ECU 11. That is, the ECU 11 determines the current value of the current flowing through the current sensor 10v using the voltage value input from the current sensor 10v when the current value of the current flowing through the current sensor 10v is 0 A as a reference value. The current sensor 10w is also configured in the same manner. In the following description, the above reference value will be referred to as an origin learning value.

Therefore, when the origin learning values of the current sensor 10v and the current sensor 10w change for some reason, the current value determined by the ECU 11 differs from the current value of the current actually flowing through the current sensors 10v and 10w. In such a case, in order that the current value of the current energized to the coil 2v (2w) corresponding to the current sensor 10v (10w) in which the origin learning value has changed follows the target value, the voltage value of the voltage applied to the coil 2v (2w) is changed. Therefore, the current value of the current actually flowing through the coil corresponding to the sensor 10v (10w) in which the origin learning value has changed differs from the target value, and the current value (peak value) of the current for energizing each of the three coils 2u, 2v, 2w will be different. As a result, since the q-axis current pulsates, the output torque of the motor 2 may pulsate and the vibration may be transmitted to the vehicle 1.

Figure 3:
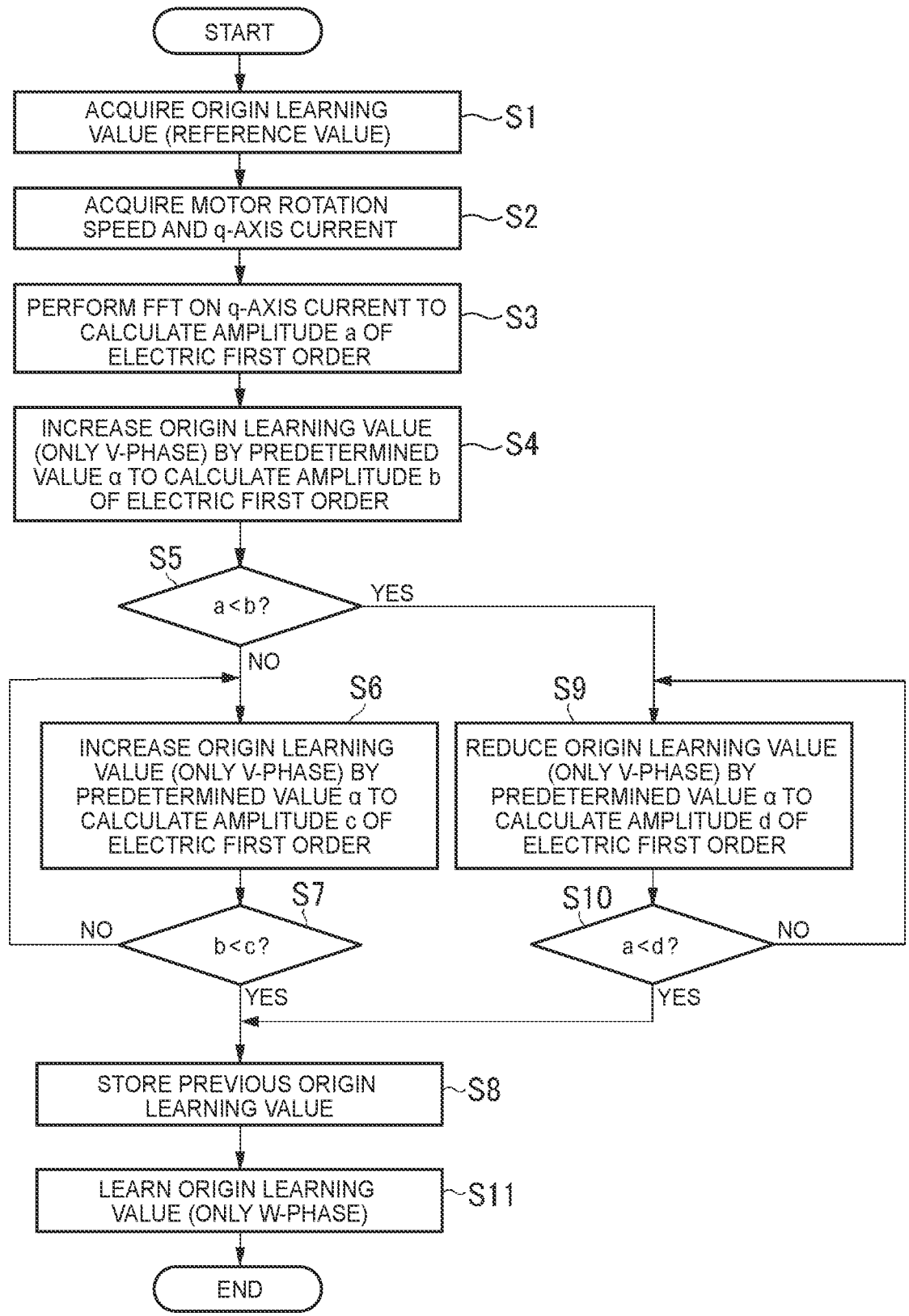
FIG. 3 is a flowchart illustrating a control example executed by a motor control device of the present disclosure.

Therefore, the motor control device according to the embodiment of the present disclosure is configured to correct the origin learning value of the current sensor 10v and the current sensor 10w based on the vibration of the q-axis current. FIG. 3 shows a flowchart illustrating the control example. The control example shown in FIG. 3 is executed by the ECU 11, and first, the origin learning value is acquired (step S1). In this step S1, the origin learning value stored in the ECU 11 may be read.

Then, the motor rotation speed and the q-axis current are acquired (step S2). The motor rotation speed can be obtained based on the signal detected by the motor rotation speed sensor. Further, for the q-axis current, first, the detected values of the sensors 10v, 10w of each phase are stored in the ECU 11 for a predetermined period, and the above detected values are added to the origin learning value acquired in step S1 to obtain the current value for a predetermined period. Subsequently, as is conventionally known, the transition of the q-axis current for a predetermined period is obtained from the current value of each phase and the motor rotation speed.

Subsequently, the q-axis current obtained in step S2 is subjected to a fast Fourier transform (FFT) to calculate an amplitude a of the electric first order (step S3). After that, only the origin learning value for the current sensor 10v is increased by a predetermined value a, and the same processing as in step S2 and step S3 is performed again to calculate an amplitude b of the electric first order (step S4). In step S4, after increasing the origin learning value, the rotation speed of the motor 2 and the detected values of the current sensors 10v, 10w may be acquired again to obtain the q-axis current, or the motor rotation speed and the detected values of the current sensors 10v, 10w acquired in step S2 may be used to obtain the q-axis current.

Then, it is determined whether the amplitude b obtained in step S4 is larger than the amplitude a obtained in step S3 (step S5). That is, it is determined whether the amplitude of the electric first order of the q-axis current is increased after the origin learning value is changed than before the origin learning value is changed. In other words, it is determined whether the origin learning value is changing in order to reduce the amount of deviation between the target value of the origin learning value and the origin learning value set at the present time to determine the actual current value.

When the amplitude b obtained in step S4 is smaller than the amplitude a obtained in step S3 and it is determined as negative in step S5, it is considered that the origin learning value is changing toward the target value of the origin learning value. Therefore, only the origin learning value for the current sensor 10v is further increased by a predetermined value a, and the same processing as in step S2 and step S3 is performed again to calculate an amplitude c of the electric first order (step S6). Subsequently, it is determined whether the amplitude c obtained in step S6 is larger than the amplitude b obtained in step S4 (step S7).

When it is determined as negative in step S7 because the amplitude c obtained in step S6 is smaller than the amplitude b obtained in step S4, the process returns to step S6. That is, the origin learning value is increased by a predetermined value a, the amplitude of the electric first order at the increased origin learning value is obtained, and the step of comparing the obtained amplitude of the electric first order with the amplitude of the electric first order at the origin learning value set immediately before is repeated until the amplitude of the electric first order at the origin learning value set immediately before increases (that is, until it is determined as positive in step S7). That is, the origin learning value is increased until the amplitude of the q-axis current switches from the decreasing tendency to the increasing tendency.

When it is determined as positive in step S7 due to the increase in the amplitude of the electric first order, the origin learning value set immediately before the amplitude of the electric first order increases is stored in the ECU 11 (step S8).

On the other hand, when it is determined as positive in step S5 because the amplitude b obtained in step S4 is larger than the amplitude a obtained in step S3, the amplitude a obtained in step S3 is reduced by a predetermined value a, and the same process as step S3 is performed again to calculate an amplitude d of the electric first order (step S9). Subsequently, it is determined whether the amplitude d obtained in step S9 is larger than the amplitude a obtained in step S3 (step S10).

When it is determined as negative in step S10 because the amplitude d obtained in step S9 is smaller than the amplitude a obtained in step S3, the process returns to step S9. That is, the origin learning value is decreased by a predetermined value a, the amplitude of the electric first order at the decreased origin learning value is obtained, and the step of comparing the obtained amplitude of the electric first order with the amplitude of the electric first order at the origin learning value set immediately before is repeated until the amplitude of the electric first order at the origin learning value set immediately before increases (that is, until it is determined as positive in step S10).

When it is determined as positive in step S10 due to the increase in the amplitude of the electric first order, the origin learning value set immediately before the amplitude of the electric first order increases is stored (learned) in the ECU 11 (step S8).

After the origin learning value for the current sensor 10v is stored in the ECU 11 in step S8, the origin learning value for the current sensor 10w is learned and stored in the ECU 11 (step S11). In this step S11, the origin learning value for adding or subtracting the predetermined value a in steps S4 to S10 may be rewritten to the W phase to execute the same steps.

Figure 4:
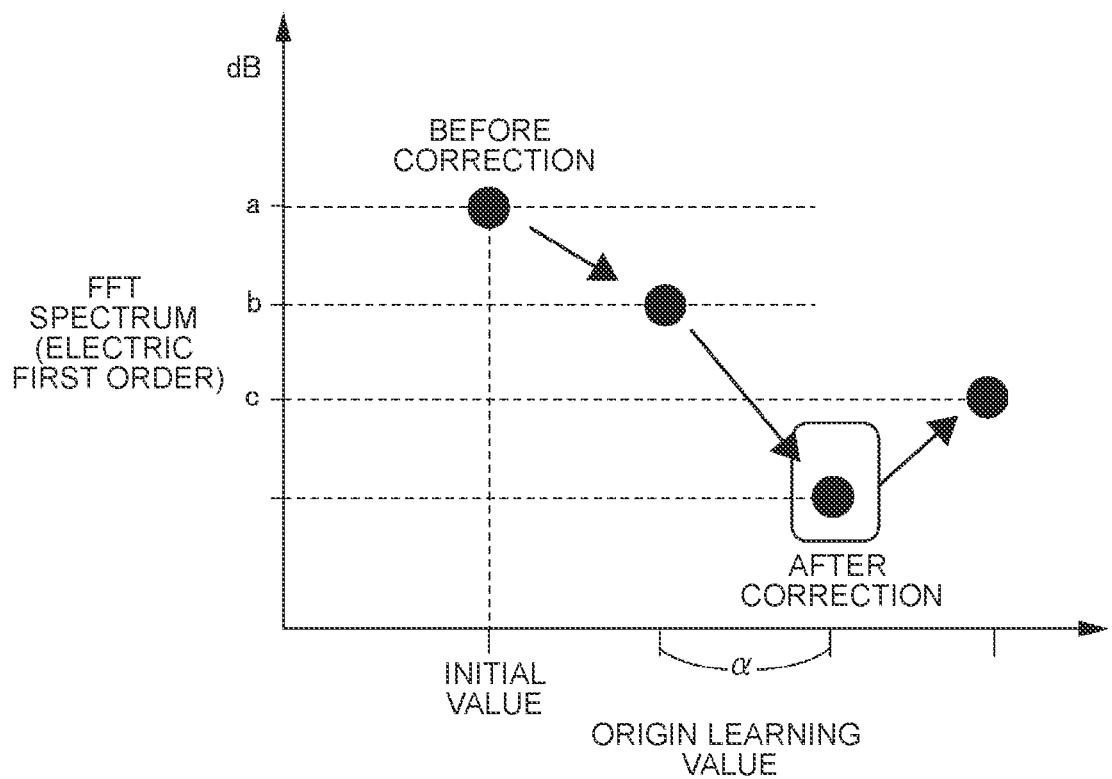
FIG. 4 is a diagram showing changes in an origin learning value and a fast Fourier transform (FFT) spectrum when the control example shown in FIG. 3 is executed.

FIG. 4 is a diagram illustrating the relationship between the origin learning value and the FFT spectrum of the electric first order in the q-axis current when steps S1 to S8 are executed, and the origin learning value is shown on the horizontal axis and the FFT spectrum is shown on the vertical axis. In the example shown in FIG. 4, when the motor 2 is driven at the origin learning value (initial value) acquired in step S1, the FFT spectrum obtained in step S2 is a. From that state, by increasing the origin learning value by a predetermined value a, the FFT spectrum gradually decreases. Then, as a result of increasing the initial origin learning value by predetermined values a, the FFT spectrum increases at a predetermined origin learning value.

Therefore, when the predetermined origin learning value increases, it is determined as positive in step S7. As a result, the origin learning value immediately before the FFT spectrum increases is stored in the ECU 11 in step S8.

Figure 5:
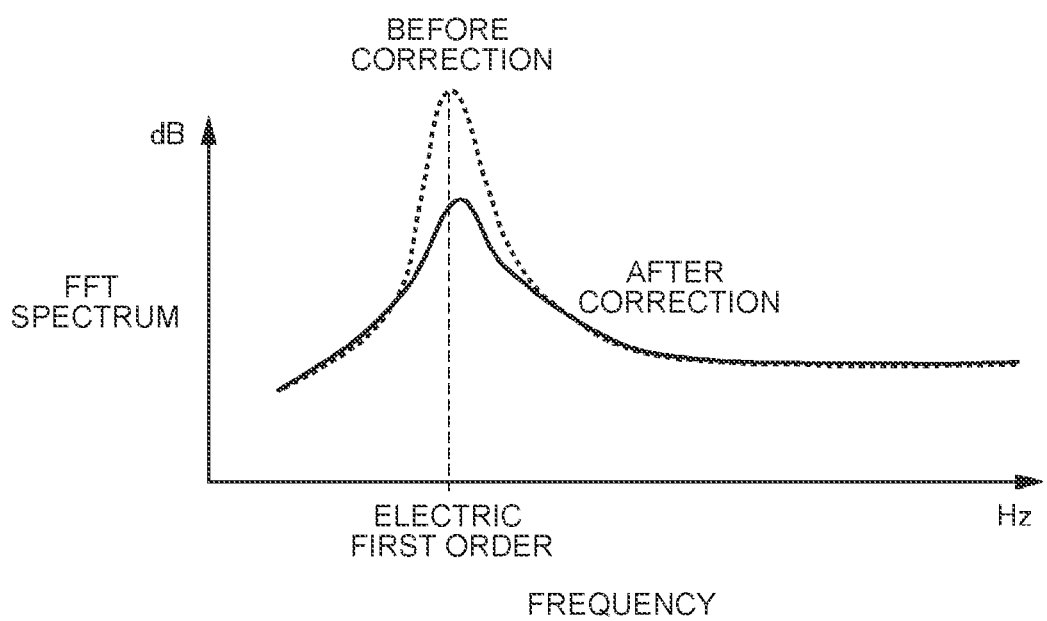
FIG. 5 is a diagram showing the effect of reduction in pulsation of a q-axis current by correcting the origin learning value.
Figure 6:
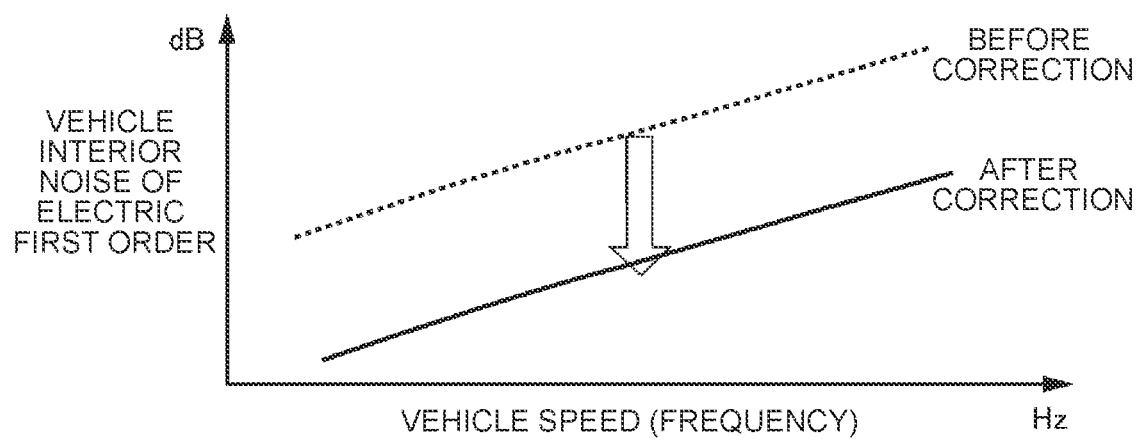
FIG. 6 is a diagram showing the effect of reduction in vehicle cabin noise by correcting the origin learning value.

FIGS. 5 and 6 are diagrams illustrating the effect when the origin learning value is corrected by executing the above control example. FIG. 5 shows the vibration frequency on the horizontal axis and the FFT spectrum on the vertical axis. FIG. 6 shows the vehicle speed on the horizontal axis and the vehicle interior noise of the electric first order on the vertical axis.

As shown in FIG. 5, when the vibration of the electric first order is significantly larger than the vibration of other orders and the origin learning value is corrected by executing the above control example (solid line), the FFT spectrum is lower than before the control example is executed and before the origin learning value is corrected (dashed line). This shows that the pulsation (amplitude) of the q-axis current is reduced, and as a result, the motor noise is reduced.

Since the motor noise is reduced as described above, it can be understood from FIG. 6 that the vehicle interior noise is reduced from the low vehicle speed range to the high vehicle speed range when the origin learning value is corrected by executing the above control example (solid line) than before the control example is executed and before the origin learning value is corrected (dashed line).

As described above, by obtaining the origin learning value at which the pulsation of the q-axis current becomes small to correct the origin learning value, it is possible to accurately correct the origin learning value without being affected by factors such as noise from peripheral devices or the temperature of the current sensors. As a result, the motor noise can be reduced, and eventually the vibration of the vehicle and the vehicle interior noise can be reduced.

In the embodiment of the present disclosure, the origin learning value is corrected based on the change in the amplitude of the electric first order in the q-axis current due to the change of the origin learning value. However, the origin learning value may be corrected based on the amplitude of the electric second order or other orders. Further, the motor is not limited to a motor provided with the three-phase coils, and may be a motor provided with coils of four or more phases. That is, it is only necessary that the motor control device according to the embodiment of the present disclosure is configured to obtain the amplitude of a predetermined order in the q-axis current each time the origin learning value is changed, and correct the origin learning value based on the origin learning value at the time when the amplitude switches from the decreasing tendency to the increasing tendency.

What is claimed is:

1. A motor control device including a motor that includes multi-phase coils and that generates torque corresponding to a current for energizing the multi-phase coils, a current sensor that detects a current value of a current for energizing at least one predetermined coil of the multi-phase coils and that outputs a signal corresponding to the detected current value, and a controller that obtains a current value of a current flowing through the predetermined coil by adding an origin learning value to the signal input from the current sensor and that controls a current for energizing the predetermined coil based on the obtained current value, wherein the controller is configured to obtain, each time the origin learning value is changed by a predetermined value, an amplitude of a predetermined order in a q-axis current of the motor based on the changed origin learning value and the signal input from the current sensor, and correct the origin learning value based on the origin learning value at the time when the amplitude switches from a decreasing tendency to an increasing tendency, wherein the amplitude of the predetermined order is obtained by performing a fast Fourier transform on the q-axis current.

2. The motor control device according to claim 1, wherein the predetermined order includes an electric first order.

3. The motor control device according to claim 1, wherein the motor is provided in a tire wheel.

4. The motor control device according to claim 1, wherein:
- the motor includes a U-phase coil, a V-phase coil, and a W-phase coil, and a neutral point to which one terminal of each of the U-phase coil, the V-phase coil, and the W-phase coil is connected; and
- the current sensor includes a first current sensor that detects a current flowing through any one of the U-phase coil, the V-phase coil, and the W-phase coil, and a second current sensor that detects a current flowing through another one of the U-phase coil, the V-phase coil, and the W-phase coil.

\* \* \* \* \*